United States Patent [19]

Silver et al.

[11] E Re. 30,228

[45] Reissued Mar. 11, 1980

[54] POWER CABLE WITH CORRUGATED OR SMOOTH LONGITUDINALLY FOLDED METALLIC SHIELDING TAPE

[75] Inventors: David A. Silver, Livingston; George Bahder, Edison, both of N.J.

[73] Assignee: General Cable Corporation, Greenwich, Conn.

[21] Appl. No.: 837,187

[22] Filed: Sep. 28, 1977

Related U.S. Patent Documents

Reissue of:

[64] Patent No.: 3,651,244
Issued: Sep. 28, 1977
Appl. No.: 640,092
Filed: Dec. 12, 1975

U.S. Applications:

[63] Continuation of Ser. No. 640,092, Dec. 12, 1975, abandoned, which is a continuation of Ser. No. 335,259, Feb. 23, 1973, abandoned.

[51] Int. Cl.[2] ..... H01B 9/02

[52] U.S. Cl. ..... 174/36; 156/54; 174/102 SC; 174/102 D; 174/103; 174/105 R; 174/107; 174/113 R

[58] Field of Search ..... 174/13, 25 R, 36, 102 R, 174/102 D, 102 SC, 103, 105 R, 105 SC, 106 SC, 106 D, 107, 110 R, 113 R, 110 AR, 116, 120 SC, 120 SR; 156/48, 54

[56] References Cited

U.S. PATENT DOCUMENTS

| | | | |
|---|---|---|---|
| 2,998,840 | 9/1961 | Davis | 174/102 X |
| 3,087,007 | 4/1963 | Jachimowicz | 174/110 PM |
| 3,137,120 | 6/1964 | Bodenbender | 174/107 UX |
| 3,272,911 | 9/1966 | Rollins et al. | 174/106 R |
| 3,287,489 | 11/1967 | Hvizd, Jr. | 174/102 R |
| 3,339,007 | 8/1967 | Blodgett | 174/36 |
| 3,379,821 | 4/1968 | Garner | 174/36 |
| 3,441,660 | 4/1969 | Garner | 174/102 SC |
| 3,474,189 | 10/1969 | Plate et al. | 174/115 |

FOREIGN PATENT DOCUMENTS

| | | | |
|---|---|---|---|
| 6709221 | 1/1969 | Netherlands | 174/102 SC |

*Primary Examiner*—Arthur T. Grimley
*Attorney, Agent, or Firm*—Roy C. Hopgood; John M. Calimafde; Charles W. Neill

[57] ABSTRACT

This electrostatic shielding tape is a metal strip of low resistance and low reactance folded longitudinally over the length of an insulated power cable having a semi-conducting insulation shield surrounding its insulation. The longitudinally folded metallic tape has its edges free to permit expansion of the insulation and insulation shield, located directly under it, without significant deformation of the insulation and the insulation shield. When the tape is of a metal requiring a thin corrosion-protective coating, the coating on the side adjacent to the insulation shield is preferably semi-conducting to accept charging current from the insulation shield. It is a feature that the metal of the electrostatic shield is in electrical communication with the insulation shield.

23 Claims, 11 Drawing Figures

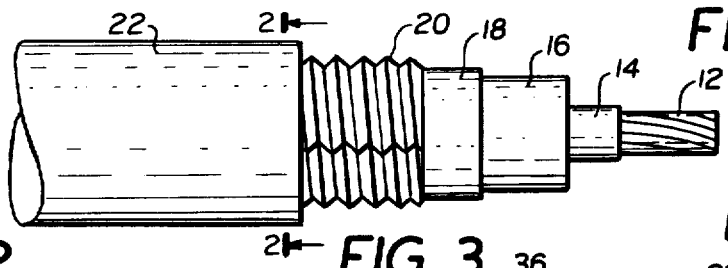
FIG. 1.
FIG. 2.
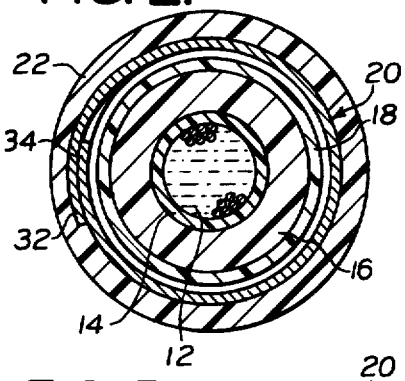
FIG. 3.
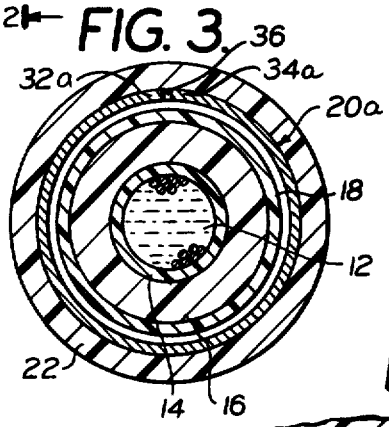
FIG. 4.
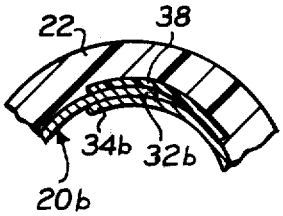
FIG. 5.
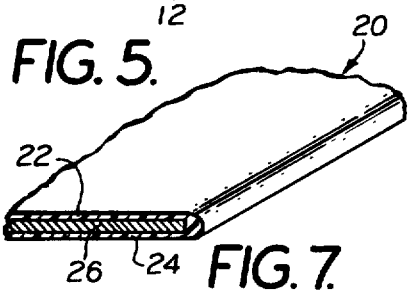
FIG. 6.
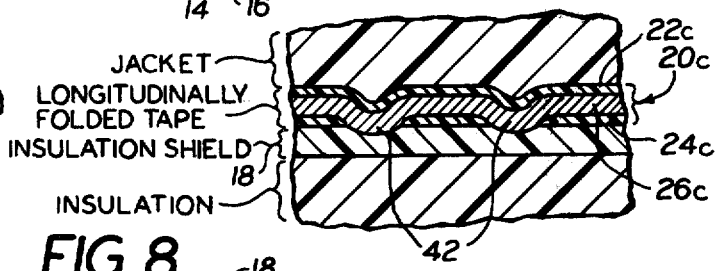
FIG. 7.
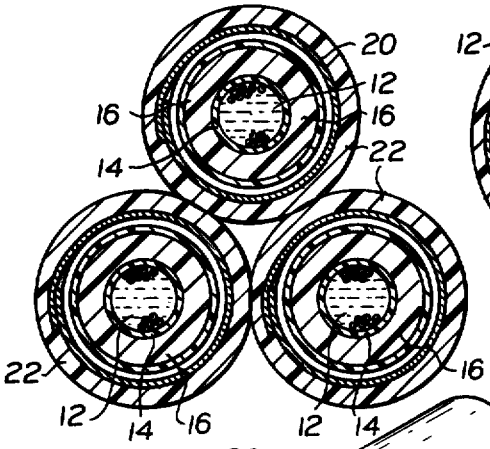
FIG. 8.
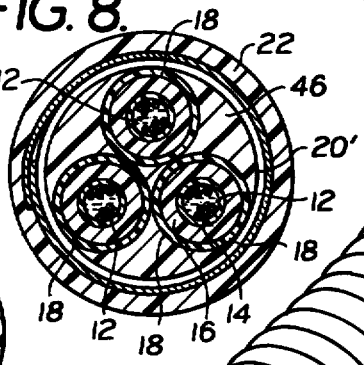
FIG. 9.
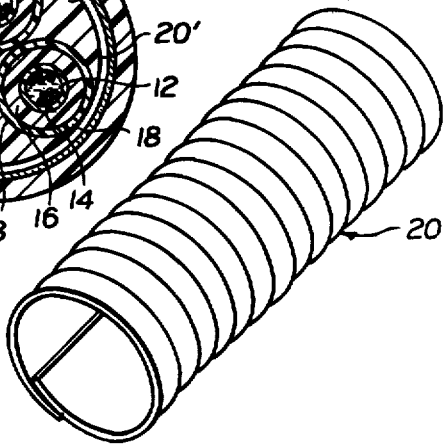
FIG. 10.
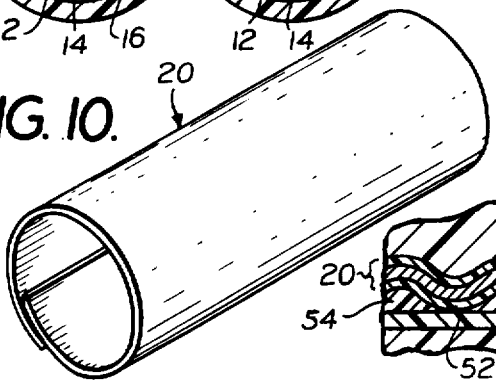
FIG. 11.
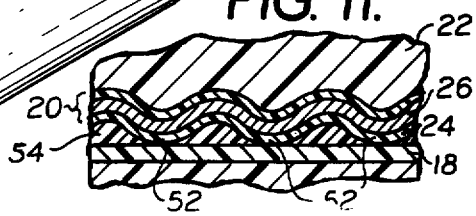

POWER CABLE WITH CORRUGATED OR SMOOTH LONGITUDINALLY FOLDED METALLIC SHIELDING TAPE

Matter enclosed in heavy brackets [ ] appears in the original patent but forms no part of this reissue specification; matter printed in italics indicates the additions made by reissue.

*This application is a continuation of Ser. No. 640,092, filed Dec. 12, 1975, now abandoned, which is a continuation of Ser. No. 335,259, filed Feb. 23, 1973, now abandoned, which is a reissue of U.S. Pat. No. 3,651,244.*

BACKGROUND AND SUMMARY OF THE INVENTION

The purpose of this invention is to provide a superior means of electrostatic shielding for power cables. It consists of an essentially full coverage longitudinally folded smooth or corrugated metallic tape which will permit expansion of the insulation and insulation shield, located directly under it, without significant deformation when the cable is at elevated temperatures corresponding to its normal, emergency and short circuit operating conditions. The tape may have a thin corrosion protective nonmetallic coating on one or both sides. This coating may be semi-conducting on one or both sides to permit the metallic shielding tape to accept charging current from the insulation structure while protecting certain metals, such as aluminum, against corrosion due to ingress of moisture into the cable.

The application of the metallic shielding tape so that it is longitudinally folded along the length of the cable further provides a permanent low resistance, low reactance path for voltage and current surges due to lightning or switching and for fault current regardless of whether the metallic tape is plain or coated for protection against corrosion. Circumferential corrugations in the tape as employed on cables of larger diameter facilitate bending of the cable during manufacture, installation and in training of the cable for splicing and terminating.

In the majority of cases the shielding tape will take the form of a longitudinally folded and overlapped corrugated copper or aluminum shielding tape. In the latter case the aluminum will have a firmly bonded semi-conducting layer of a polyethylene or polyvinyl chloride based compound on the side of the tape facing the semi-conducting insulation shield. The other side of the tape may have the same coating of an insulating coating of the same type compound and perhaps treated or with a supplementary coating to facilitate bonding to the overall jacket. In the case of the copper shielding tape, a longitudinally applied bridging tape over the exposed edge of the metallic tape with or without a binder thread may be employed to prevent the edge of the metallic tape from cutting into the jacket. The longitudinally folded tape shield may be applied in the same operation as the overall jacket or in a separate operation.

This invention may be employed in single conductor cable which may be shipped as such or factory-cabled into an assembly of two or more single conductor cables or in multiple conductor cable with an overall covering.

This method of shielding is superior to that which is presently commonly used whereby a metallic tape, normally plain or tinned copper, is helically applied overlapped on itself, by approximately 10 to 25 percent of its width, over the insulation structure (including semi-conducting insulation shield) of the cable. With this type of presently used shield, uneven expansion of the insulation structure of the cable occurs at elevated temperatures under normal and particularly under emergency and short circuit operating conditions, due to the reinforcing action of the double thickness of tape at the overlaps. As a consequence thereof, at elevated temperatures the insulation and insulation shield are significantly deformed such that they take on the surface contour of an interlocked or BX armored cable. This severe deformation may adversely affect the electrical properties and physical integrity of the insulation and may seriously increase the resistivity of the insulation shield, leading to premature failure of the cable.

With this presently used method of metallic tape shield application, it is not practical to make use of low-cost aluminum metal. Uncoated aluminum is not acceptable for the purpose because it is highly susceptible to corrosion on ingress of moisture into the cable. The application of a thin layer of semi-conducting or insulating material to one or both sides of the aluminum tape to protect it against corrosion will result in a very high resistance, high reactance path when the tape is helically applied on the cable forming a short lay helical path for voltage surges and fault currents.

Both of the adverse conditions described above are corrected by this invention in which the tape is longitudinally folded rather than helically applied. In addition, longitudinally folding the tape around the cable provides a permanently lower resistance and reactance shield path for the same amount of metal as when the tape is helically applied and the cable is subjected to aging and load cycling in service. A very important advantage is that longitudinally folding the metallic shielding tape permits the use of a corrosion-protected low-cost aluminum tape which, by virtue of a firmly bonded semi-conducting layer, will permit the aluminum shield to accept charging currents from the insulation structure of the cable.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic elevation, progressively broken away to show the inner structure of a power cable provided with the electrostatic shield of this invention;

FIG. 2 is a sectional view taken on the line 2—2 of FIG. 1;

FIG. 3 is a sectional view, similar to FIG. 2, but showing a modified form of seam;

FIG. 4 is a view similar to FIG. 3 but showing still another modified form of seam;

FIG. 5 is a greatly enlarged fragmentary view showing a portion of the electrostatic shield with corrosion-protective coating;

FIG. 6 is a greatly enlarged sectional view showing a modified form of electrostatic shield for this invention;

FIG. 7 is a sectional view showing the combination of three single conductor cables, each equipped with the electrostatic shield of this invention;

FIG. 8 is a sectional view showing a three-conductor cable with a common electrostatic shield surrounding the three cables;

FIG. 9 is a diagrammatic view of the electrostatic shield with a corrugated construction of the shield;

FIG. 10 is a view similar to FIG. 9 but showing a shield without corrugation; and FIG. 11 is a fragmentary, greatly enlarged, sectional view showing the corrugated electrostatic shield of cable 9 applied to a cable and having semi-conducting filler material for increasing the electrical communication between the metal of the electrostatic shield and the insulation shield of the cable.

DESCRIPTION OF PREFERRED EMBODIMENT

This invention is used for power cables, an example of which is shown in FIG. 1. The cable illustrated has a center metallic conductor 12 surrounded with a semi-conducting shield 14, over which there is a layer of insulation 16 of substantial thickness, depending upon the size of the cable and the voltage with which it is intended to be used. Insulation shielding 18 surrounds the insulation 16 and is a semi-conducting layer.

Around the outside of the insulation shielding 18 there is a longitudinally folded metal tape 20, shown in the drawing as helically corrugated; and there is a jacket 22 around the outside of the metal tape 20 for protecting it from mechanical damage. The construction thus far described has been used on power cables.

In the more conventional power cable constructions, the shielding which occupies the position of the metal tape 20 is a helically wrapped tape with each convolution overlapping the next convolution by a predetermined amount. Such constructions have the objection that the shielding is of greater hoop strength where the convolutions overlap than at the locations where there is no overlap; and when the insulation and insulation shielding expand as the result of heating during operation of the cable, the insulation and its shielding will be more restrained at the overlap sections of the surrounding tape and the expansion causes the insulation and its shielding to assume a variable diameter, analogous to the surface of a BX cable, as previously explained.

Longitudinally folded tapes have been used at the location of the tape 20. One feature of this invention is a construction of the tape 20 which maintains it in electrical communication with the semi-conducting insulation shielding. The construction of the tape 20 is shown more fully in FIGS. 2 and 5.

FIG. 3 shows the tape 20 with a small scale so that no attempt is made to illustrate protective coating on this tape for preventing corrosion. It is desirable to use aluminum as the metal for the tape 20 and since aluminum requires corrosion-protective coating, plastic coatings 23 and 24 are provided on the outside and inside, respectively, of an aluminum strip 26. (FIG. 5).

The aluminum strip 26 preferably has a thickness of between 5 and 10 mils and the corrosion-protective coatings 23 and 24 have a thickness of between 1 and 3 mils. All of the coatings 23 and 24 may be semi-conducting; but in order to maintain electrical communication between the aluminum strip 26 and the insulation shielding which is covered by the tape 20, it is necessary that at least the coating 24 be semi-conducting if the entire coating is not made of semi-conducting material.

The coatings 23 and 24 are preferably polyethylene and at least the portion of these coatings 23 and 24, which contact with the metal, is a copolymer with reactive carboxyl groups for obtaining a chemical bond between the coatings 23 and 24 and the aluminum strip 26. Other protective coatings can be used on the aluminum strip 26; for example: the polyethylene may be cross-linked, or the coating may be made of polyvinyl chloride, ethylene propylene rubber, or other polyolefin-based material or other thin, nonmetallic layers for increasing resistance to corrosion. In order to obtain a semi-conducting plastic for the coating 24, electrical conducting material such as carbon black is mixed with the plastic, in accordance with conventional practice in the cable industry.

The tape 20 can be made of material other than aluminum, for example: copper, brass, bronze, steel, stainless steel, zinc, or ferrous or nonferrous metals, the metal being nonmagnetic in the case of single conductor cables.

The width of the tape 20 is greater than the circumference of the insulation shielding 18 so that there are edge portions 32 and 34 overlapping one another but not welded or otherwise bonded to one another. As the insulation 16 and insulation shielding 18 expand with heating of the cable, the edge portions 32 and 34 are free to slide on one another to increase the diameter and circumference of the electrostatic shield formed by the tape 20.

FIG. 3 shows a modified construction in which the electrostatic shield is formed by a tape 20a folded longitudinally over the insulation shielding 18 and similar to the electrostatic shield, corresponding parts in FIG. 3 being designated by the same reference characters as in FIG. 2 but with a letter "a" appended.

The tape 20a is of less width with respect to the circumference of the insulation shielding 18 so that edge portions 32a and 34a do not overlap one another. They may touch each other along a butt seam or there may be an open gap 36 between the edges 32a and 34a. The width of this gap changes with change in temperature but the gap is always narrow, so that the shield formed by the tape 20a extends around substantially the entire circumference of the insulation shielding 18. The tape 20a, if made of aluminum, can be of the same construction as described in connection with FIG. 5.

FIG. 4 shows another modification in which the electrostatic shield is formed by a tape 20b, similar to the tape 20 of FIG. 2, and with corresponding parts designated by the same reference characters but with the letter "b" appended. This tape 20b has edges portions 32b and 34b which overlap one another and in order to protect the jacket 22 from being cut or damaged by the outer edge 32b, particularly when the tape 20b has a sharp corner, a bridging tape 38 of plastic material is applied over the seam of the tape 20b so as to cover the corner of the outer edge portion 32b. The edge portions 32b and 34b are preferably free to slide over one another, and the bridging tape 38 can be bonded to either the edge portion 32b or the edge portion 34b, or can be bonded to both where there is sufficient resilience in the material of the bridging tape 38 to permit expansion of the electrostatic shield with changes in temperature of the insulation shielding and insulation directly under the electrostatic shield.

The jacket 22 may be made of polyethylene, low, medium or high-density, or copolymers thereof, cross-linked polyethylene, polyvinyl chloride, neoprene, chlorosulphonated polyethylene, chlorinated polyethylene, ethylene propylene rubber, or other materials for providing resistance to mechanical damage.

FIG. 6 shows a construction in which an electrostatic shield is formed by a tape 20c which has corrosion-protective coating 23c over its outer surface and corrosion-protective coating 24c over most of its inner surface. Neither of the coatings 23c or 24c is semi-conducting. In order to establish electrical communication between a metal strip 26c of the tape 20c, the tape 20c has embossed areas 42 projecting toward the insulation shielding 18, and the coating 24c is removed from the surface of the tape 20c over these embossed areas 42. This results in a direct contact between the metal strip 26c and the semi-conducting insulation shielding 18 so as to establish the electrical communication between the metal of the electrostatic shield and the semi-conducting material of the insulation shielding. This construction shown in FIG. 6 can be used in place of the other tapes having continuous coating, as shown in FIG. 5.

FIG. 7 shows three single conductor cables which can be twisted together; and in this construction each of the conductors has its own electrostatic shield, as shown in FIG. 1; or the electrostatic shield can be any of the modified constructions shown in FIGS. 3, 4 and 6. It will be understood that the electrostatic shield can be either corrugated or non-corrugated, depending upon the size of the cable and the degree of flexibility desired.

FIG. 8 shows a cable with three conductors, each with a conductor shield, insulation and an insulation shielding, as in FIG. 1, the parts being designated by the same reference characters as in FIGS. 1 and 2. The construction in FIG. 8 differs, however, from that in FIG. 7 in that the individual conductors 12 do not have separate electrostatic shields around their insulation, and insulation shieldings. The cable of FIG. 8 has conventional filler material 46 for giving the construction circular cross section; and there is a single electrostatic shield formed by a tape 20′ surrounding the group of insulated conductors 12.

This electrostatic shield formed by the tape 20′ is shown as corrugated and the inner humps of the corrugation contact with the insulation shieldings 18 of the individual conductors 12. Although the area of contact of the tape 20′ with the semi-conducting insulation shieldings 18 of the conductors 12 is of restricted area, it does establish electrical communication between the tape 20 and the insulation shieldings 18 of the conductors 12 of the cable shown in FIG. 8.

FIG. 9 is an isometric view of the longitudinally folded tape 20 of FIGS. 1 and 2. FIG. 10 shows a similar tape 20″ which may be similar in all respects to that shown in FIG. 9 except that it is uncorrugated.

FIG. 11 shows a modified construction for increasing the area of electrical communication between the metal strip 26 of the electrostatic shield and the semi-conducting layer of the insulation shielding 18. Although most of the downwardly extending humps 52 of the corrugated tape 20 touch the semi-conducting material of the insulation shielding 18, the area of contact for transfer of current between the tape 20 and the insulation shielding 18 is increased in FIG. 11 by providing a semi-conducting compound 54, which fills the space between the insulation shielding 18 and the upwardly projecting humps of the tape 20. This compound 54 also serves the useful function of preventing passage of moist air or water longitudinally in the cable between the tape 20 and the semi-conducting insulation shielding 18.

The preferred construction of the invention and some modifications have been illustrated and described, and the invention is defined in the appended claims.

What is claimed is:

1. In a high voltage electrostatically shielded power cable including a metal conductor, a semi-conducting shield around the conductor, electrical insulation around the shield, a semi-conducting insulation shielding around the outside of the insulation and a metallic electrostatic shield over the semi-conducting insulation shielding, the improvement which comprises the metallic shield being a longitudinally folded strip of metal which provides a low resistance, low reactance path, for voltage and current surges caused by lightning or switching or fault currents, lengthwise of the cables, the electrostatic shield being made of corrosive metal and having corrosion-protecting coating on both sides; the electrostatic shield having its longitudinal edge portions free to move circumferentially with respect to one another and the electrostatic shield having its inside surface in contact with the insulation shielding and free throughout its length and circumference to move circumferentially over the insulation shielding with which the electrostatic shield contacts as the diameter and circumference of the electrostatic shield change with thermal expansion and contraction of the insulation and the insulation shield as the cable changes its temperature during normal, emergency and short-circuiting operating conditions whereby the insulation and insulation shield expand without axially spaced localized distortion, and said metal of the electrostatic shield being in electrical communication with the semi-conducting insulation shielding through the coating on the inside surface of said electrostatic shield for accepting charging current from the insulation shielding.

2. The combination described in claim 1 characterized by a plastic jacket surrounding the electrostatic shield, and the electrostatic shield being free throughout its length and circumference to move circumferentially over the surface of the jacket with which said electrostatic shield contacts.

3. The combination described in claim 1 characterized by an extruded plastic jacket surrounding the electrostatic shield, and a longitudinally extending bridging tape of plastic material covering the outside of the seam of the electrostatic shield for preventing injury of the jacket by a longitudinal metal edge of the electrostatic shield as the shield expands and contracts with change of temperature of the cable.

4. The combination described in claim 1 characterized by the electrostatic shield having a corrosion-protective coating on at least its inner surface which confronts the insulation shielding and which is in contact therewith, said protective coating being semi-conducting and constituting the electrical communication between the metal of the electrostatic shield and the insulation shielding.

5. The combination described in claim 4 characterized by the electrostatic shield being aluminum with corrosion-protective coating on both sides of the aluminum consisting of polyethylene with reactive carboxyl groups in at least the part of the coating which is adjacent to the aluminum and with electrical conductive material mixed throughout the coating on at least the side of the aluminum which confronts the insulation shielding whereby the coating material on that side of the aluminum is semi-conducting.

6. The combination described in claim 1 characterized by the electrostatic shield being made of metal from the group consisting of copper, aluminum, brass, bronze, steel, stainless steel and zinc and the electrostatic shield being coated on at least one side with material from the group consisting of polyethylene, cross-linked polyethylene, polyvinyl chloride, and ethylene propylene rubber, and a jacket over the electrostatic shield made of material from the group consisting of polyethylene, low, medium or high-density, and copolymers thereof, cross-linked polyethylene, polyvinyl chloride, neoprene, chlorosulphonated polyethylene, chlorinated polyethylene, and ethylene propylene rubber, said jacket being substantially thicker than the electrostatic shield and providing the electrostatic shield with protection from mechanical damage.

7. The combination described in claim 1 characterized by the metal of the electrostatic shield having a protective coating of plastic material on at least the side confronting the insulating shielding, and the metal of the electrostatic shield being embossed to produce protuberances extending downward toward the insulation shielding, the protuberances having the coating removed therefrom so that the metal surfaces thereof contact directly with the semi-conducting material of the insulation shielding.

8. The combination described in claim 1 characterized by the electrostatic shield being corrugated with the corrugations extending in a generally circumferential direction and with most of the downwardly extending humps of the corrugations having contact with the insulation shielding, and semi-conducting material filling the spaces between the insulation shielding and the upwardly extending humps of the corrugations for establishing electrical communication between the face of the electrostatic shield that confronts the insulation shielding and for preventing passage of moist air and water longitudinally of the cable between the insulation layer and the electrostatic shield.

9. The combination described in claim 8 characterized by the metal of the electrostatic shield being coated with an adherent coating for corrosion protection of the metal, the coating on at least the inside of the electrostatic shield being made of semi-conducting material.

10. The combination described in claim 1 characterized by the cable containing a plurality of conductors, each of which has its own conductor shield, insulation and insulation shielding, and a single electrostatic shield surrounding all of the individual insulated conductors and contacting with the insulation shielding of each of the individual conductors around a portion of the circumference of the insulation shielding of each individual conductor.

11. The combination described in claim 10 characterized by the cable containing three individual conductors located in a triangular configuration and having the circumferences of their insulation shieldings tangent to the inside surface of the electrostatic shield, filler material in the spaces where the insulation shieldings do not touch the electrostatic shield for maintaining a circular contour for the cable, and a protective jacket surrounding the electrostatic shield.

12. The combination described in claim 4 characterized by the electrostatic shield having corrosion-protective coating on both the inside and outside surfaces of the metal of the electrostatic shield, the coating on the inside surface of the metal being semi-conducting and the coating on the outside of the metal being covered by a plastic jacket for protecting the electrostatic shield from mechanical damage, the protective coatings of the electrostatic shield being strongly bonded to the metal, but the outside surface of the electrostatic shield coating being adhered to the jacket by light bonding which facilitates stripping of the jacket from the electrostatic shield without damage to the electrostatic shield.

*13. In a high voltage electrostatically shielded power cable including a metal conductor, a semi-conducting shield around the conductor, electrical insulation around the shield, a semi-conducting insulation shielding around the outside of the insulation and a metallic electrostatic shield over the semi-conducting insulation shielding, the improvement which comprises the metallic shield being a longitudinally folded and corrugated strip of metal which provides a low resistance, low reactance path, for voltage and current surges caused by lightning or switching or fault currents, lengthwise of the cable, the electrostatic shield having its longitudinal edge portions free to move circumferentially with respect to one another and the electrostatic shield having its inside surface in contact with the insulation shielding and free throughout its length and circumference to move circumferentially over the insulation shield with which the electrostatic shield contacts as the diameter and circumference of the electrostatic shield change with thermal expansion and contraction of the insulation and the insulation shield as the cable changes its temperature during normal, emergency and short-circuiting operating conditions whereby the insulation and insulation shield expand without constricting and damaging the insulation at axially spaced localized distortion, and said metal of the electrostatic shield is in electrical communication with the semi-conducting insulation shielding for accepting charging current from the insulation shielding, characterized by the electrostatic shield being corrugated with the corrugations extending in a generally circumferential direction and with most of the downwardly extending humps of the corrugations having contact with the insulation shielding, and semi-conducting material filling the spaces between the insulation shielding and the upwardly extending humps of the corrugations for establishing electrical communication between the face of the electrostatic shield that confronts the insulation shielding and for preventing passage of moist air and water longitudinally of the cable between the insulation layer and the electrostatic shield.*

*14. A high voltage power transmission cable which periodically carries heavy current that heats the cable to a temperature that substantially increases the diameter and cross-section of the cable, including in combination a cable core comprising a metal center conductor, polyolefin insulation surrounding the conductor, a semi-conducting plastic shield under the insulation and extending inward immediately adjacent to the conductor, and another semiconducting plastic shield covering the outside surface of the insulation, said plastic shields and insulation having a combined radial thickness substantially as great as the radius of the metal center conductor; an electrostatic metal shield surrounding the cable core and in contact with the cable core around the circumference thereof, all of the shields of the cable being made of non-magnetizable material, said metal shield comprising a metal tape that is longitudinally folded around the core in heat-exchanging contact therewith, longitudinal edge portions of the metal shield forming a seam with edge portions that are free to move circumferentially with respect to one another to increase and decrease the circumferential extend of the metal shield to accommodate the changes in the cross-section of the core as the core diameter increases and decreases*

*with temperature changes of the core as the result of load cycling, current surges, and switching and fault currents in the power cable, an outer protecting plastic jacket around the metal shield and exerting pressure against said metal shield, the metal shield and the outer jacket having elastic characteristics that maintain the metal shield in constant heat-exchanging contact with the core and the protecting jacket in constant heat-exchanging contact with the shield for transferring heat from the core to the ambient atmosphere around the cable, but the outer jacket and metal shield confronting one another over areas of substantial pressure that prevents free circumferential sliding movement of the jacket on the surface of the metal shield, and means for preventing excessive localized stretching of the jacket by distributing the stretching thereof beyond the region where the edges of the seam of the metal shield move locally with respect to one another, said means comprising a bridging tape overlying the seam and extending in circumferential directions beyond the outer overlapped edge of the metal shield, said bridging tape being sandwiched between the metal shield and the outer protecting jacket and being made of material across which the confronting width of the outer jacket is free to stretch, the bridging tape on one side of the outer seam edge being movable circumferentially with respect to one of the edge portions of the metal shield to increase the circumferential distance within which the outer jacket can stretch in excess of the circumferential movement of the edges of the metal shield with respect to one another and without friction contact of the outer jacket and the area of the metal shield over which the bridging tape extends.*

*15. The high voltage power transmission cable described in claim 14 characterized by the insulation being a solid extrudant that has a coefficient of thermal expansion substantially twenty times as great as the metal of the metal shield with resulting increase in the cross-section of the core, when heated, substantially greater than the increase in the cross-section of the space that would be enclosed by the metal shield when heated to substantially the same temperature as the insulation without any movement of the edges of the horizontal seam of the metal shield.*

*16. The high voltage power transmission cable described in claim 14 characterized by the cable shield being made with overlapping edges and made of resilient metal whereby the resilience of the metal exerts force to slide the edges of the metal shield over one another in a direction to decrease the circumference of the metal shield as it cools, whereby the metal shield maintains its heat exchanging contact with the core, the bridging tape being made of material having resilience that permits circumferential stretching of the tape at and circumferentially beyond both sides of the edge of the outside lap of the seam of the metal shield in response to movement of the metal shield at the overlap of the seam.*

*17. The high voltage power transmission cable described in claim 14 characterized by the outer jacket being made of plastic that stretches as the shield expands and that maintains a hoop pressure on the metal shield for supplying added force to hold the metal shield in heat-exchanging contact with the core.*

*18. The high voltage power transmission cable described in claim 14 characterized by the jacket being of elastomeric plastic material that maintains a radial pressure against the outside of the metal shield at all times during load cycling of the cable.*

*19. The high voltage power transmission cable described in claim 14 characterized by the conductor comprising a plurality of strands in contact with and uninsulated from one another.*

*20. The high voltage power transmission cable described in claim 14 characterized by the cable having only one conductor and the combined thickness of the solid insulation and the semi-conducting shield being greater than the radius of the conductor and less than the diameter of the conductor.*

*21. The high voltage power transmission cable described in claim 14 characterized by an outer jacket around the metal shield and hugging said metal shield, the outer jacket being made of plastic that stretches as the shield expands and that maintains a hoop pressure on the metal shield for supplying force to hold the metal shield in contact with the core, and the electrostatic shield being made of metal from the group consisting of copper, aluminum, brass, bronze, stainless steel and zinc and the jacket over the electrostatic shield made of material from the group consisting of polyethylene, low, medium or high density, and copolymers thereof, cross-linked polyethylene, polyvinyl chloride, neoprene, chlorosulphonated polyethylene, chlorinated polyethylene, and ethylene propylene rubber, said jacket being substantially thicker than the electrostatic shield and providing the electrostatic shield with protection from mechanical damage.*

*22. The combination described in claim 14 characterized by the cable containing a plurality of conductors, each of which has its own conductor shield, insulation and insulation shield, and a single electrostatic shield surrounding all of the individual insulated conductors and contacting with the insulation shielding of each of the individual conductors around a portion of the circumference of the insulation shielding of each individual conductor.*

*23. The high voltage power transmission cable described in claim 22 characterized by the cable containing three individual conductors located in a triangular configuration and having the circumference of their insulation shielding tangent to the inside surface of the electrostatic shield, filler material in the spaces where the insulation shieldings do not touch the electrostatic shield for maintaining a circular contour for the cable, and a protective jacket surrounding the electrostatic shield.*

* * * * *